(12) United States Patent
Some et al.

(10) Patent No.: US 12,038,376 B2
(45) Date of Patent: Jul. 16, 2024

(54) PURIFYING A SAMPLE SOLUTION VIA REAL-TIME MULTI-ANGLE LIGHT SCATTERING

(71) Applicant: Wyatt Technology, LLC, Goleta, CA (US)

(72) Inventors: Daniel I. Some, Atlit (IL); Michael I. Larkin, Santa Barbara, CA (US)

(73) Assignee: Wyatt Technology, LLC, Goleta, CA (US)

( * ) Notice: Subject to any disclaimer, the term of this patent is extended or adjusted under 35 U.S.C. 154(b) by 0 days.

(21) Appl. No.: 17/385,899

(22) Filed: Jul. 26, 2021

(65) Prior Publication Data

US 2022/0120678 A1 Apr. 21, 2022

Related U.S. Application Data

(60) Provisional application No. 63/056,681, filed on Jul. 26, 2020.

(51) Int. Cl.
*G01N 21/47* (2006.01)
*G01N 21/01* (2006.01)

(52) U.S. Cl.
CPC ..... *G01N 21/47* (2013.01); *G01N 2021/0143* (2013.01); *G01N 2021/4711* (2013.01)

(58) Field of Classification Search
CPC .......... G01N 21/47; G01N 2021/0143; G01N 2021/4711; G01N 15/0211
See application file for complete search history.

(56) References Cited

U.S. PATENT DOCUMENTS

| | | | |
|---|---|---|---|
| 6,774,994 B1 * | 8/2004 | Wyatt | G01N 21/51 356/336 |
| 2005/0075851 A1 | 4/2005 | Trainoff | |
| 2009/0222219 A1 * | 9/2009 | Some | G01N 15/0205 702/25 |

(Continued)

OTHER PUBLICATIONS

International Search Report and Written Opinion in International Application No. PCT/US2022/038406, dated Oct. 27, 2022.

(Continued)

*Primary Examiner* — Rebecca C Bryant
(74) *Attorney, Agent, or Firm* — Schmeiser, Olsen & Watts LLP; Leonard Guzman

(57) ABSTRACT

The present disclosure describes a computer implemented method, a system, and a computer program product of purifying a sample solution via real-time multi-angle light scattering. In an embodiment, the method, system, and computer program product include receiving from a MALS instrument baseline scattering intensity values of a pure buffer, receiving from the MALS instrument scattering intensity values of a sample solution, and characterizing at least one component of the sample solution, resulting in a time series of values of a dimension, D, of the at least one component and a time series of values of excess Rayleigh ratio, R0, of the at least one component, and determining that the values of the dimension, D, fall within a dimension, D, value range and that the values of excess Rayleigh ratio, R0, fall within an excess Rayleigh ratio value range, and transmitting a collect sample solution command to collect the sample solution.

24 Claims, 13 Drawing Sheets

(56) References Cited

U.S. PATENT DOCUMENTS

2011/0269635 A1* 11/2011 Some ............... G01N 15/0205
506/9
2013/0303732 A1 11/2013 Hewig, III et al.

OTHER PUBLICATIONS

Aguilar, et al., "At-line multi-angle light scattering detector for faster process development in enveloped virus-like particle purification", Journal of Separation Science, Aug. 2019, vol. 42, No. 16, pp. 2640-2649, http://DOI.org/10.1002/jssc.201900441.
Bousse, et al., "Quantitation of influenza virus using field flow fractionation and multi-angle light scattering for quantifying influenza A particles", Journal of Virological Methods, 2013, vol. 193(2), pp. 589-596, doi: 10.1016/j.jviromet.2013.07.026.
Patel, et al., "Multi-angle light scattering as a process analytical technology measuring real-time molecular weight for downstream process control", MABS, 2018, vol. 10, No. 7, pp. 945-950, https://doi.org/10.1080/19420862.2018.1505178.
Wei, et al., "Biophysical characterization of influenza virus subpopulations using field flow fractionation and multiangle light scattering: correlation of particle counts, size distribution and infectivity", Journal of Virological Methods, 2007, vol. 144(1-2), pp. 122-132, doi: 10.1016/j.jviromet.2007.04.008.
International Preliminary Report on Patentability in PCT/US2022/038406 mailed on Feb. 8, 2024.

* cited by examiner

PURIFYING A SAMPLE SOLUTION VIA REAL-TIME MULTI-ANGLE LIGHT SCATTERING

PRIORITY

This application claims priority to U.S. Provisional Patent Application No. 63/056,681, filed Jul. 26, 2020.

BACKGROUND

The present disclosure relates to multi-angle light scattering, and more specifically, to purifying a sample solution via real-time multi-angle light scattering.

SUMMARY

The present disclosure describes a computer implemented method, a system, and a computer program product of purifying a sample solution via real-time multi-angle light scattering. In an exemplary embodiment, the computer implemented method, the system, and the computer program product include (1) receiving, by a computer system, from a multi-angle light scattering (MALS) instrument baseline scattering intensity values of a pure buffer flowed from a chromatography system to the MALS instrument, (2) in response to receiving the baseline scattering intensity values of the pure buffer, receiving, by the computer system, from the MALS instrument scattering intensity values of a sample solution flowed from the chromatography system to the MALS instrument, (3) in response to receiving the baseline scattering intensity values of the pure buffer and in response to receiving the scattering intensity values of the sample solution, executing, by the computer system, a set of logical operations characterizing at least one component of the sample solution, resulting in a time series of values of a dimension, D, of the at least one component and a time series of values of excess Rayleigh ratio, R0, of the at least one component, (4) executing, by the computer system, a set of logical operations determining that the values of the dimension, D, fall within a dimension, D, value range and that the values of excess Rayleigh ratio, R0, fall within an excess Rayleigh ratio, R0, value range, where the excess Rayleigh ratio, R0, value range indicates that sufficient signal has been received from the MALS instrument for a reliable calculation of the values of the dimension, D, and where the dimension, D, value range indicates that the sample solution meets quality requirements, (5) in response to determining that the values of the dimension, D, fall within the dimension, D, value range and that the values of excess Rayleigh ratio, R0, fall within the excess Rayleigh ratio, R0, value range, transmitting, by the computer system, a collect sample solution command to collect the sample solution in a product pool, (6) executing, by the computer system, a set of logical operations determining that at least one of that the values of the dimension, D, do not fall within the dimension, D, value range and that the values of excess Rayleigh ratio, R0, do not fall within the excess Rayleigh ratio, R0, value range, and (7) in response to determining that at least one of that the values of the dimension, D, do not fall within the dimension, D, value range and that the values of excess Rayleigh ratio, R0, do not fall within the excess Rayleigh ratio, R0, value range, transmitting, by the computer system, a divert to waste command to divert the sample solution to a waste container.

DETAILED DESCRIPTION

Figure 1:
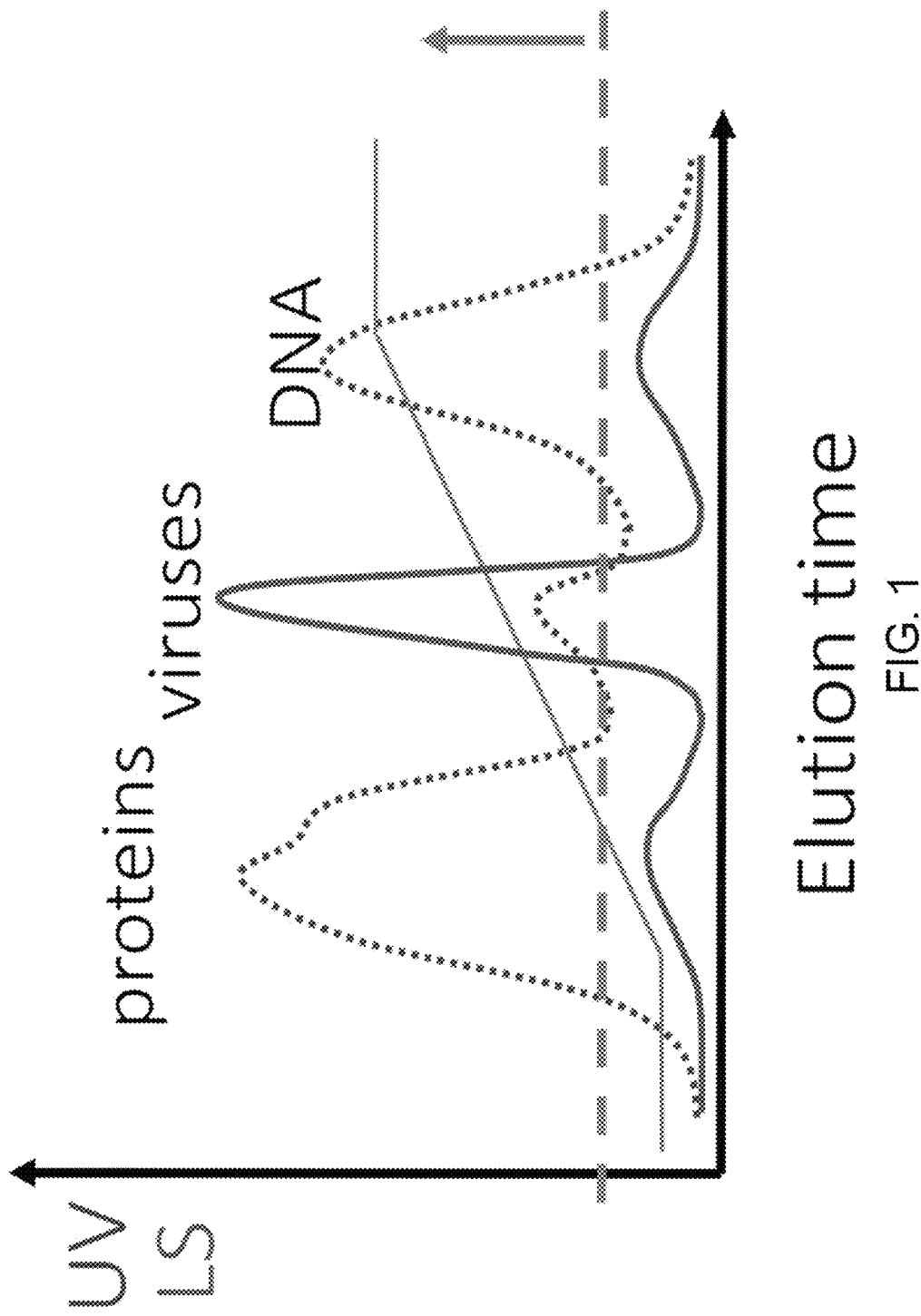
FIG. 1 depicts an existing graph.

The present disclosure describes a computer implemented method, a system, and a computer program product of purifying a sample solution via real-time multi-angle light scattering. In an exemplary embodiment, the computer implemented method, the system, and the computer program product include (1) receiving, by a computer system, from a multi-angle light scattering (MALS) instrument baseline scattering intensity values of a pure buffer flowed from a chromatography system to the MALS instrument, (2) in response to receiving the baseline scattering intensity values of the pure buffer, receiving, by the computer system, from the MALS instrument scattering intensity values of a sample solution flowed from the chromatography system to the MALS instrument, (3) in response to receiving the baseline scattering intensity values of the pure buffer and in response to receiving the scattering intensity values of the sample solution, executing, by the computer system, a set of logical operations characterizing at least one component of the sample solution, resulting in a time series of values of a dimension, D, of the at least one component and a time series of values of excess Rayleigh ratio, R0, of the at least one component, (4) executing, by the computer system, a set of logical operations determining that the values of the dimension, D, fall within a dimension, D, value range and that the values of excess Rayleigh ratio, R0, fall within an excess Rayleigh ratio, R0, value range, where the excess Rayleigh ratio, R0, value range indicates that sufficient signal has been received from the MALS instrument for a reliable calculation of the values of the dimension, D, and where the dimension, D, value range indicates that the sample solution meets quality requirements, (5) in response to determining that the values of the dimension, D, fall within the dimension, D, value range and that the values of excess Rayleigh ratio, R0, fall within the excess Rayleigh ratio, R0, value range, transmitting, by the computer system, a collect sample solution command to collect the sample solution in a product pool, (6) executing, by the computer system, a set of logical operations determining that at least one of that the values of the dimension, D, do not fall within the dimension, D, value range and that the values of excess Rayleigh ratio, R0, do not fall within the excess Rayleigh ratio, R0, value range, and (7) in response to determining that at least one of that the values of the dimension, D, do not fall within the dimension, D, value range and that the values of excess Rayleigh ratio, R0, do not fall within the excess Rayleigh ratio, R0, value range, transmitting, by the computer system, a divert to waste command to divert the sample solution to a waste container. In an embodiment, the values of the dimension, D, correspond to one of a root-mean-square (rms) radius, Rg, of the at least one component, a sphere radius, R, of the at least one component, a rod length, L, of the at least one component, and a shape dimension relevant to a shape of the at least one component. In an embodiment, the values of excess Rayleigh ratio, R0, correspond to a scattering intensity of the at least one component extrapolated to an angle 0 measured by the MALS instrument. In an embodiment, the sample solution includes bionanoparticles, such as viruses for vaccines, gene therapy, or therapeutic exosomes.

In a particular embodiment, the excess Rayleigh ratio, R0, value range indicates that sufficient signal has been received from the MALS instrument for a reliable calculation when R0 is greater than a minimum threshold (e.g., $1 \times 10^{-5}$ cm$^{-1}$) of the values of the dimension, D. In a particular embodiment, the dimension, D, value range indicates that the sample solution meets quality requirements when the sample solution meets product specifications.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-α-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Concentration Detector

Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $$A = -\log(\% \, T/100\%).$$

The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R). An ultraviolet absorption detector could output a concentration detector signal value corresponding to a concentration value of a sample.

Current Technologies

Current technologies experience obstacles to efficient separation between sequentially eluting viruses and macromolecules such as proteins and nucleic acids. Namely, in the course of production of bionanoparticles such as viruses for vaccines or gene therapy, or therapeutic exosomes, the particles are produced by fermentation of cells in bioreactors and must be purified from undesirable cell components such as DNA, proteins and lipids. Often such purification is accomplished by chromatographic means, such as size-exclusion chromatography, ion-exchange chromatography, hydrophobic interaction chromatography, affinity chromatography or membrane chromatography, or by other means of fractionation such as asymmetric-flow field fractionation.

In the course of chromatographic purification, the desired and undesired components are dissolved or suspended in solution and caused to flow through a stationary phase such as a column or membrane. As a result of flowing through the stationary phase, the various components are separated and elute at different times. In the case of field-flow fractionation, separation is achieved by flowing in a channel subject to different forces that affect the component transit time according to component properties such a size. Specific fractions of the eluting material are collected and pooled under the assumption that they contain the desirable components, in this case the viruses or other bionanoparticles, with minimal admixture of the undesirable components.

In order to characterize the purification process, multiple test fractions are acquired and analyzed on separate, off-line analytical instruments to determine the type and quantities of solution components in each. These properties are correlated to process parameters such as elution time and signal levels from a concentration detector such as a UV absorption detector. Then, during actual purification runs, a pool of material is collected according to the time and signal levels corresponding to those where the test fractions yielded optimal results in terms of purity and quantity. The final pool may be considered sufficiently pure or may be processed via an additional purification step to further remove impurities.

However, none of the information obtained online in the course of purification is sufficiently definitive to decide if desirable bionanoparticles are actually present in the pool or their quantity, or if undesirable aggregates of the bionanoparticles are present, as depicted in FIG. 1. As depicted in FIG. 1, if it were desired to use a UV absorption detector to identify viruses, current technologies would also detect proteins and DNA. Notably, additional off-line testing would have to be done to verify that the correct fractions had been pooled and the final quantity of viruses, etc.

As a result, there is a need to implement instrumentation and a method for determining, on-line and in real time, whether bionanoparticles are present in the eluate, if they are aggregated, and their concentration, in order to specify with definitive knowledge the optimal fractions to be collected as they elute. Thus, there is a need for purifying a sample solution via real-time multi-angle light scattering.

Figure 2A:
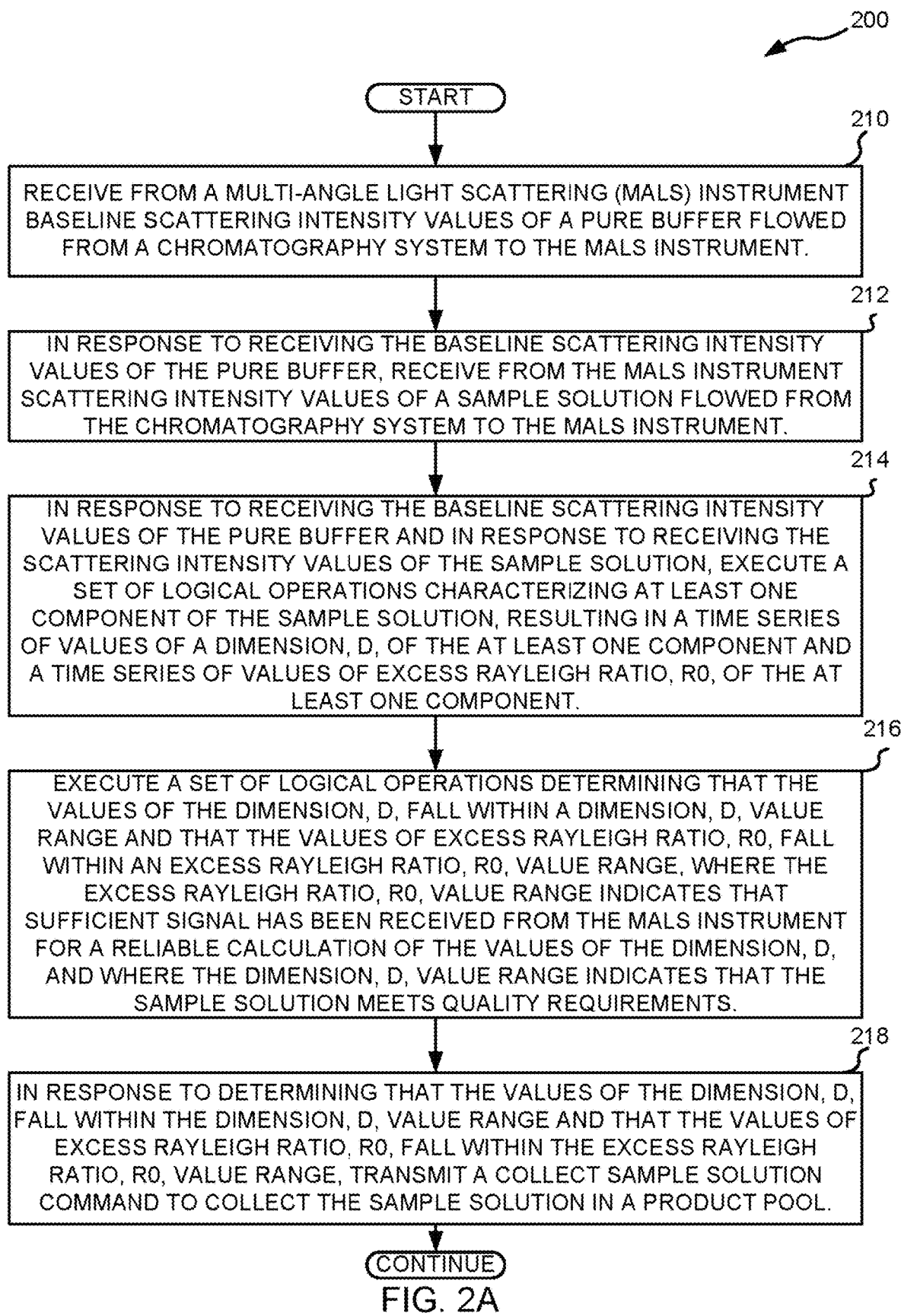
FIG. 2A depicts a flowchart in accordance with an exemplary embodiment.
Figure 2B:
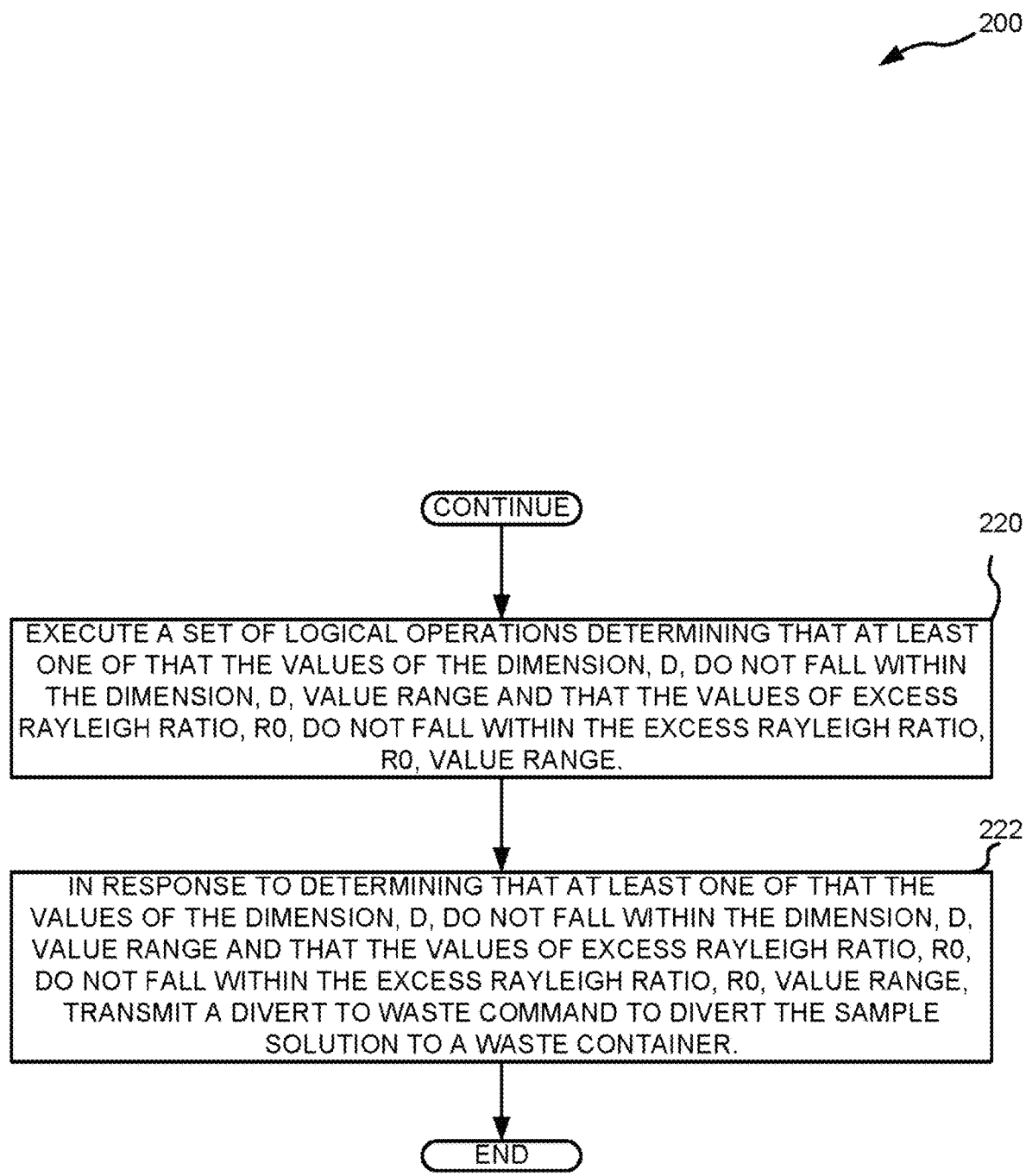
FIG. 2B depicts a block diagram in accordance with an exemplary embodiment.

Referring to FIG. 2A and FIG. 2B, in an exemplary embodiment, the computer implemented method, the system, and the computer program product are configured to perform an operation 210 of receiving, by a computer system, from a multi-angle light scattering (MALS) instrument baseline scattering intensity values of a pure buffer flowed from a chromatography system to the MALS instrument, an operation 212 of, in response to receiving the baseline scattering intensity values of the pure buffer, receiving, by the computer system, from the MALS instrument scattering intensity values of a sample solution flowed from the chromatography system to the MALS instrument, an operation 214 of, in response to receiving the baseline scattering intensity values of the pure buffer and in response to receiving the scattering intensity values of the sample solution, executing, by the computer system, a set of logical operations characterizing at least one component of the sample solution, resulting in a time series of values of a dimension, D, of the at least one component and a time series of values of excess Rayleigh ratio, R0, of the at least one component, an operation 216 of executing, by the computer system, a set of logical operations determining that the values of the dimension, D, fall within a dimension, D, value range and that the values of excess Rayleigh ratio, R0, fall within an excess Rayleigh ratio, R0, value range, where the excess Rayleigh ratio, R0, value range indicates that sufficient signal has been received from the MALS instrument for a reliable calculation of the values of the dimension, D, and where the dimension, D, value range indicates that the sample solution meets quality requirements, an operation 218 of, in response to determining that the values of the dimension, D, fall within the dimension, D, value range and that the values of excess Rayleigh ratio, R0, fall within the excess Rayleigh ratio, R0, value range, transmitting, by the computer system, a collect sample solution command to collect the sample solution in a product pool, an operation 220 of, executing, by the computer system, a set of logical operations determining that at least one of that the values of the dimension, D, do not fall within the dimension, D, value range and that the values of excess Rayleigh ratio, R0, do not fall within the excess Rayleigh ratio, R0, value range, and an operation 222, of, in response to determining that at least one of that the values of the dimension, D, do not fall within the dimension, D, value range and that the values of excess Rayleigh ratio, R0, do not fall within the excess Rayleigh ratio, R0, value range, transmitting, by the computer system, a divert to waste command to divert the sample solution to a waste container.

Figure 8:
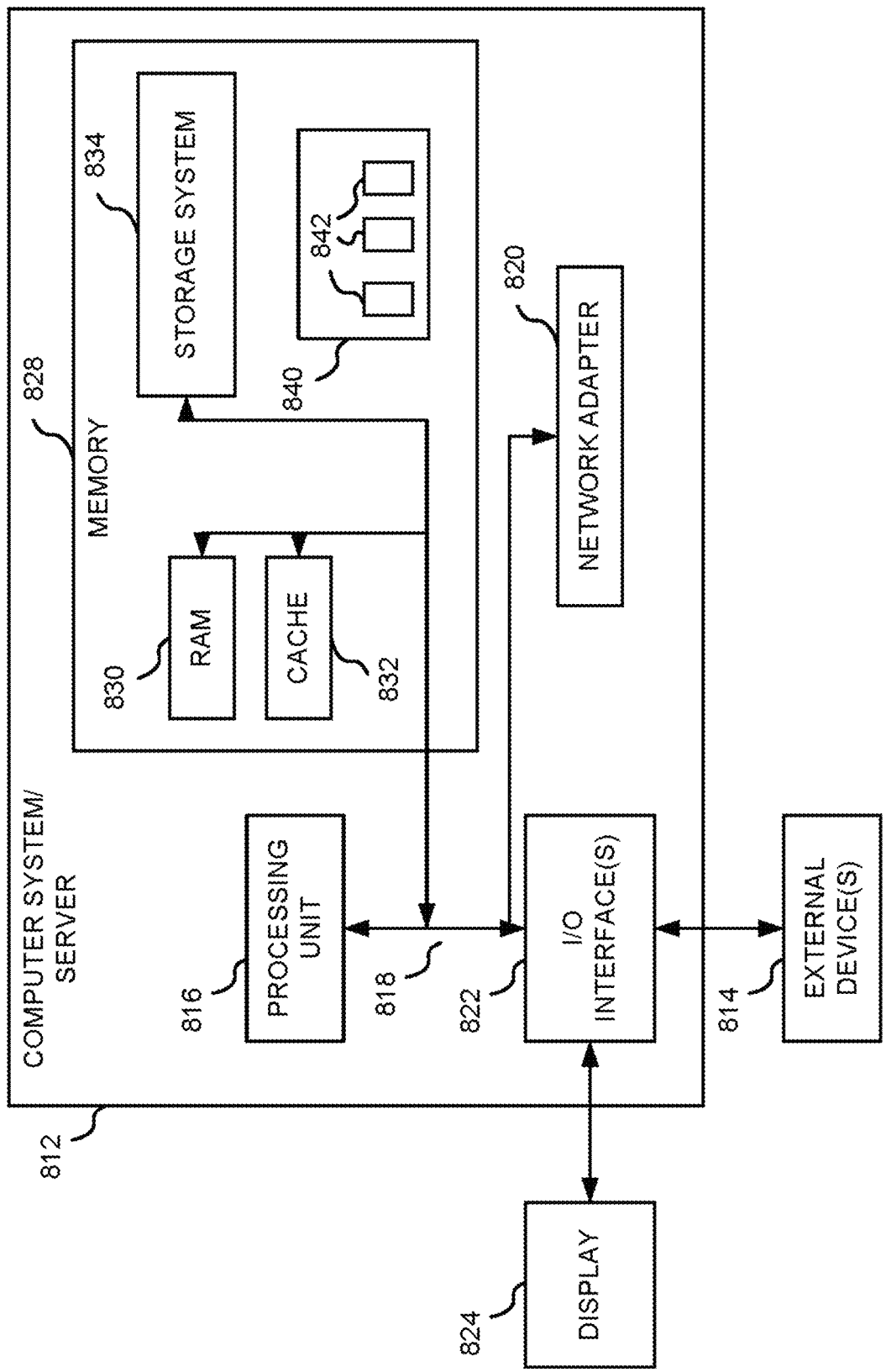
FIG. 8 depicts a computer system in accordance with an exemplary embodiment.

In an exemplary embodiment, the computer system is a standalone computer system, such as computer system 800 shown in FIG. 8, a network of distributed computers, where at least some of the computers are computer systems such as computer system 800 shown in FIG. 8, or a cloud computing node server, such as computer system 800 shown in FIG. 8. In an embodiment, the computer system is a computer system 800 as shown in FIG. 8, that executes a purifying a sample solution via real-time multi-angle light scattering script or computer software application that carries out the operations of at least method 200. In an embodiment, the computer system is a computer system/server 812 as shown in FIG. 8, that executes a purifying a sample solution via real-time multi-angle light scattering script or computer software application that carries out the operations of at least method 200. In an embodiment, the computer system is a processing unit 816 as shown in FIG. 8, that executes a purifying a sample solution via real-time multi-angle light scattering script or computer software application that carries out the operations of at least method 200.

In an embodiment, the computer system is a computer system 800 as shown in FIG. 8, that executes a purifying a sample solution via real-time multi-angle light scattering script or computer software application that carries out at least operations 210, 212, 214, 216, 218, 220, and 222. In an embodiment, the computer system is a computer system/server 812 as shown in FIG. 8, that executes a purifying a sample solution via real-time multi-angle light scattering script or computer software application that carries out at least operations 210, 212, 214, 216, 218, 220, and 222. In an embodiment, the computer system is a processing unit 816 as shown in FIG. 8, that a purifying a sample solution via real-time multi-angle light scattering script or computer software application that carries out at least operations 210, 212, 214, 216, 218, 220, and 222.

Figure 2C:
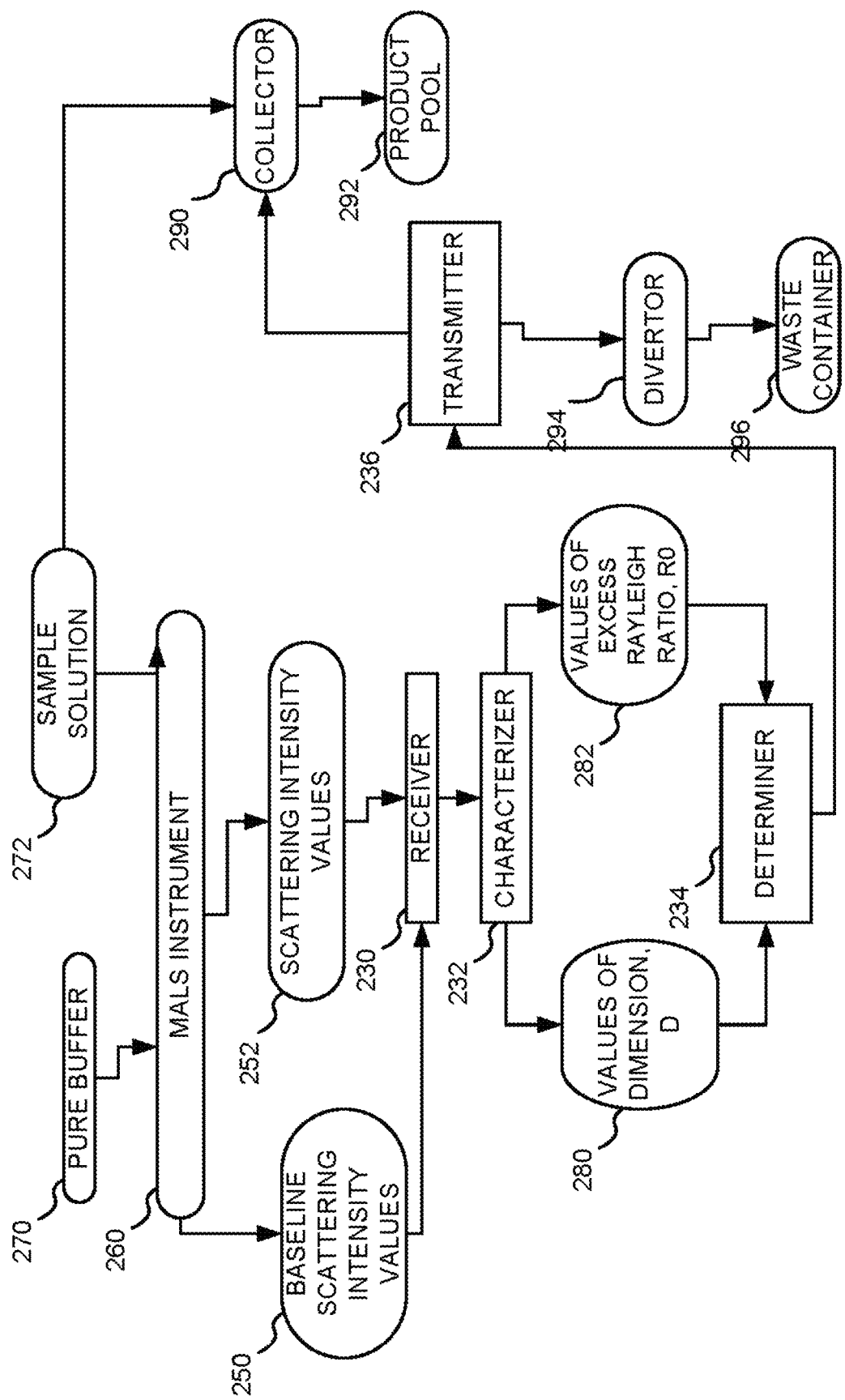
FIG. 2C depicts instruments in accordance with an embodiment.

Referring to FIG. 2C, in an exemplary embodiment, the computer implemented method, the system, and the computer program product include a receiver 230, a characterizer 232, a determiner 234, and a transmitter 236. In an embodiment, receiver 230 is configured to receive from a multi-angle light scattering (MALS) instrument 260 baseline scattering intensity values 250 of a pure buffer 270 flowed from a chromatography system to MALS instrument 260 In an embodiment, receiver 230 includes a computer system, such as computer system 800 as shown in FIG. 8, performing operation 210. In an embodiment, receiver 230 includes a computer system, such as computer system/server 812 as shown in FIG. 8, performing operation 210. In an embodiment, receiver 230 includes a computer system, such as processing unit 816 as shown in FIG. 8, performing operation 210. In an embodiment, receiver 230 is implemented as computer software executing on a computer system, such as computer system 800 as shown in FIG. 8, such that the computer system performs operation 210. In an embodiment, receiver 230 is implemented as computer software executing on a computer system, such as computer system/server 812 as shown in FIG. 8, such that the computer system performs operation 210. In an embodiment, receiver 230 is implemented as computer software executing on a computer system, such as processing unit 816 as shown in FIG. 8, such that the computer system performs operation 210. In an embodiment, receiver 230 performs operation 210 as computer software executing on a processor of receiver 230.

In an embodiment, receiver 230 is configured to, in response to receiving baseline scattering intensity values 250 of pure buffer 270, receive from MALS instrument 260 scattering intensity values 252 of a sample solution 272 flowed from the chromatography system to MALS instrument 260.

In an embodiment, receiver 230 includes a computer system, such as computer system 800 as shown in FIG. 8, performing operation 212. In an embodiment, receiver 230 includes a computer system, such as computer system/server 812 as shown in FIG. 8, performing operation 212. In an embodiment, receiver 230 includes a computer system, such as processing unit 816 as shown in FIG. 8, performing operation 212. In an embodiment, receiver 230 is implemented as computer software executing on a computer system, such as computer system 800 as shown in FIG. 8, such that the computer system performs operation 212. In an embodiment, receiver 230 is implemented as computer software executing on a computer system, such as computer system/server 812 as shown in FIG. 8, such that the computer system performs operation 212. In an embodiment, receiver 230 is implemented as computer software executing on a computer system, such as processing unit 816 as shown in FIG. 8, such that the computer system performs operation 212. In an embodiment, receiver 230 performs operation 212 as computer software executing on a processor of receiver 230.

In an embodiment, characterizer 232 includes a computer system, such as computer system 800 as shown in FIG. 8, performing operation 214. In an embodiment, characterizer 232 includes a computer system, such as computer system/server 812 as shown in FIG. 8, performing operation 214. In an embodiment, characterizer 232 includes a computer system, such as processing unit 816 as shown in FIG. 8, performing operation 214. In an embodiment, characterizer 232 is implemented as computer software executing on a computer system, such as computer system 800 as shown in FIG. 8, such that the computer system performs operation 214. In an embodiment, characterizer 232 is implemented as computer software executing on a computer system, such as computer system/server 812 as shown in FIG. 8, such that the computer system performs operation 214. In an embodiment, characterizer 232 is implemented as computer software executing on a computer system, such as processing unit 816 as shown in FIG. 8, such that the computer system performs operation 214. In an embodiment, characterizer 232 performs operation 214 as computer software executing on a processor of characterizer 232.

In an embodiment, determiner 234 includes a computer system, such as computer system 800 as shown in FIG. 8, performing operation 216. In an embodiment, determiner 234 includes a computer system, such as computer system/ server 812 as shown in FIG. 8, performing operation 216. In an embodiment, determiner 234 includes a computer system, such as processing unit 816 as shown in FIG. 8, performing operation 216. In an embodiment, determiner 234 is implemented as computer software executing on a computer system, such as computer system 800 as shown in FIG. 8, such that the computer system performs operation 216. In an embodiment, determiner 234 is implemented as computer software executing on a computer system, such as computer system/server 812 as shown in FIG. 8, such that the computer system performs operation 216. In an embodiment, determiner 234 is implemented as computer software executing on a computer system, such as processing unit 816 as shown in FIG. 8, such that the computer system performs operation 216. In an embodiment, determiner 234 performs operation 216 as computer software executing on a processor of determiner 234.

In an embodiment, transmitter 236 includes a computer system, such as computer system 800 as shown in FIG. 8, performing operation 218. In an embodiment, transmitter 236 includes a computer system, such as computer system/server 812 as shown in FIG. 8, performing operation 218. In an embodiment, transmitter 236 includes a computer system, such as processing unit 816 as shown in FIG. 8, performing operation 218. In an embodiment, transmitter 236 is implemented as computer software executing on a computer system, such as computer system 800 as shown in FIG. 8, such that the computer system performs operation 218. In an embodiment, transmitter 236 is implemented as computer software executing on a computer system, such as computer system/server 812 as shown in FIG. 8, such that the computer system performs operation 218. In an embodiment, transmitter 236 is implemented as computer software executing on a computer system, such as processing unit 816 as shown in FIG. 8, such that the computer system performs operation 218. In an embodiment, transmitter 236 performs operation 218 as computer software executing on a processor of transmitter 236.

In an embodiment, determiner 234 includes a computer system, such as computer system 800 as shown in FIG. 8, performing operation 220. In an embodiment, determiner 234 includes a computer system, such as computer system/server 812 as shown in FIG. 8, performing operation 220. In an embodiment, determiner 234 includes a computer system, such as processing unit 816 as shown in FIG. 8, performing operation 216. In an embodiment, determiner 234 is implemented as computer software executing on a computer system, such as computer system 800 as shown in FIG. 8, such that the computer system performs operation 220. In an embodiment, determiner 234 is implemented as computer software executing on a computer system, such as computer system/server 812 as shown in FIG. 8, such that the computer system performs operation 220. In an embodiment, determiner 234 is implemented as computer software executing on a computer system, such as processing unit 816 as shown in FIG. 8, such that the computer system performs operation 220. In an embodiment, determiner 234 performs operation 220 as computer software executing on a processor of determiner 234.

In an embodiment, transmitter 236 includes a computer system, such as computer system 800 as shown in FIG. 8, performing operation 222. In an embodiment, transmitter 236 includes a computer system, such as computer system/server 812 as shown in FIG. 8, performing operation 222. In an embodiment, transmitter 236 includes a computer system, such as processing unit 816 as shown in FIG. 8, performing operation 222. In an embodiment, transmitter 236 is implemented as computer software executing on a computer system, such as computer system 800 as shown in FIG. 8, such that the computer system performs operation 222. In an embodiment, transmitter 236 is implemented as computer software executing on a computer system, such as computer system/server 812 as shown in FIG. 8, such that the computer system performs operation 222. In an embodiment, transmitter 236 is implemented as computer software executing on a computer system, such as processing unit 816 as shown in FIG. 8, such that the computer system performs operation 222. In an embodiment, transmitter 236 performs operation 222 as computer software executing on a processor of transmitter 236.

Figure 2D:
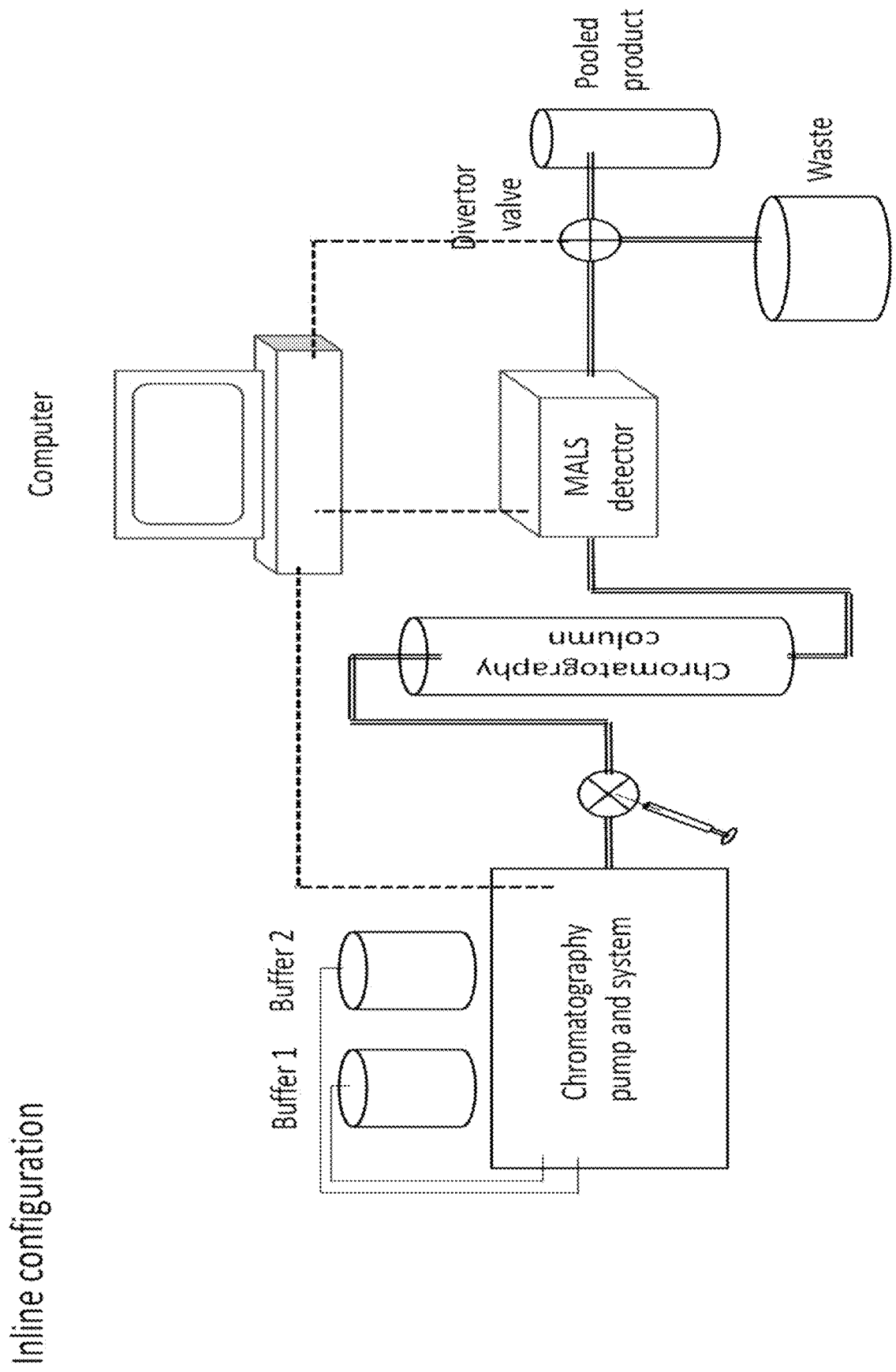
FIG. 2D depicts instruments in accordance with an embodiment.
Figure 2E:
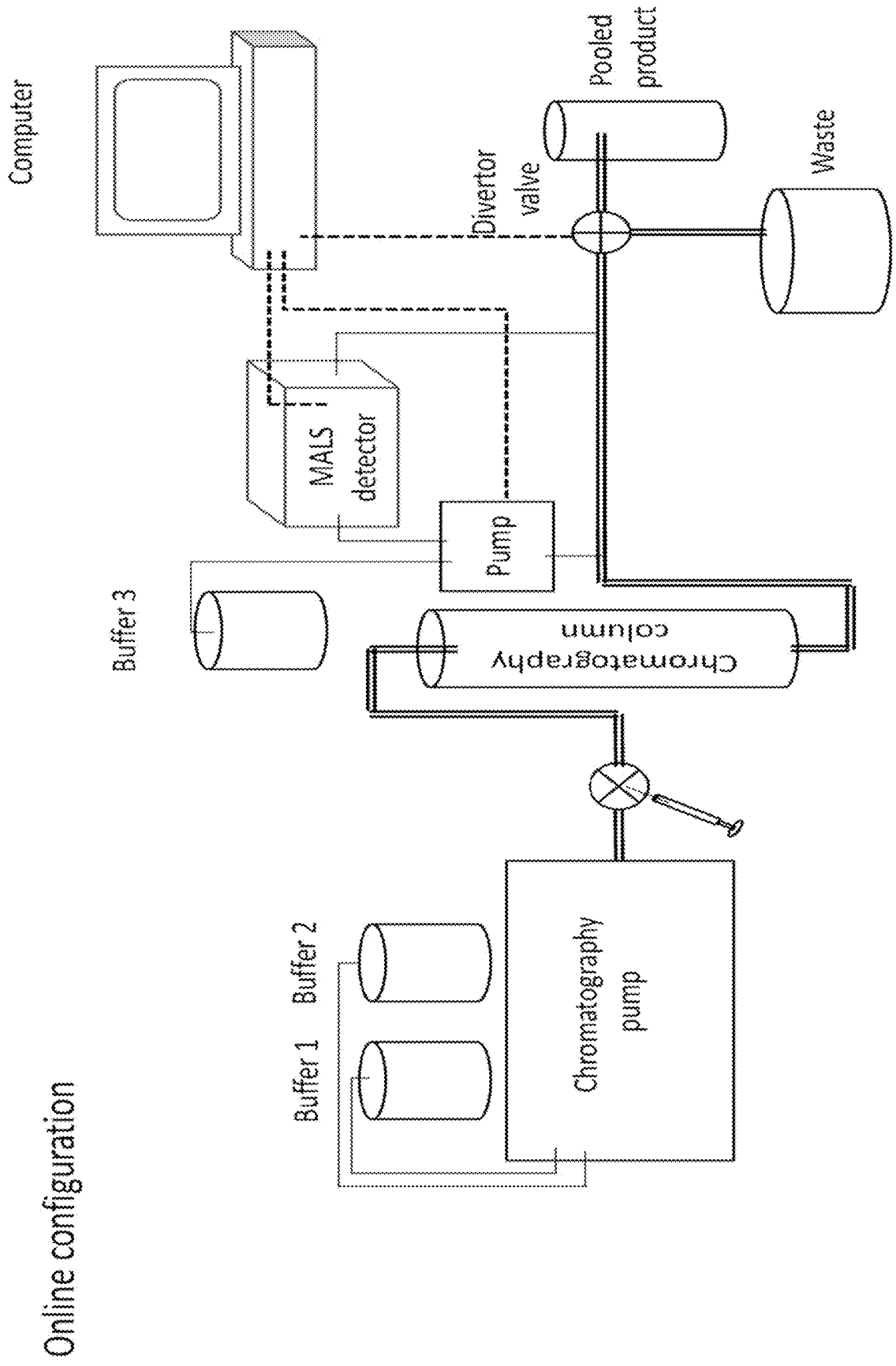
FIG. 2E depicts a graph in accordance with an embodiment.
Figure 3:
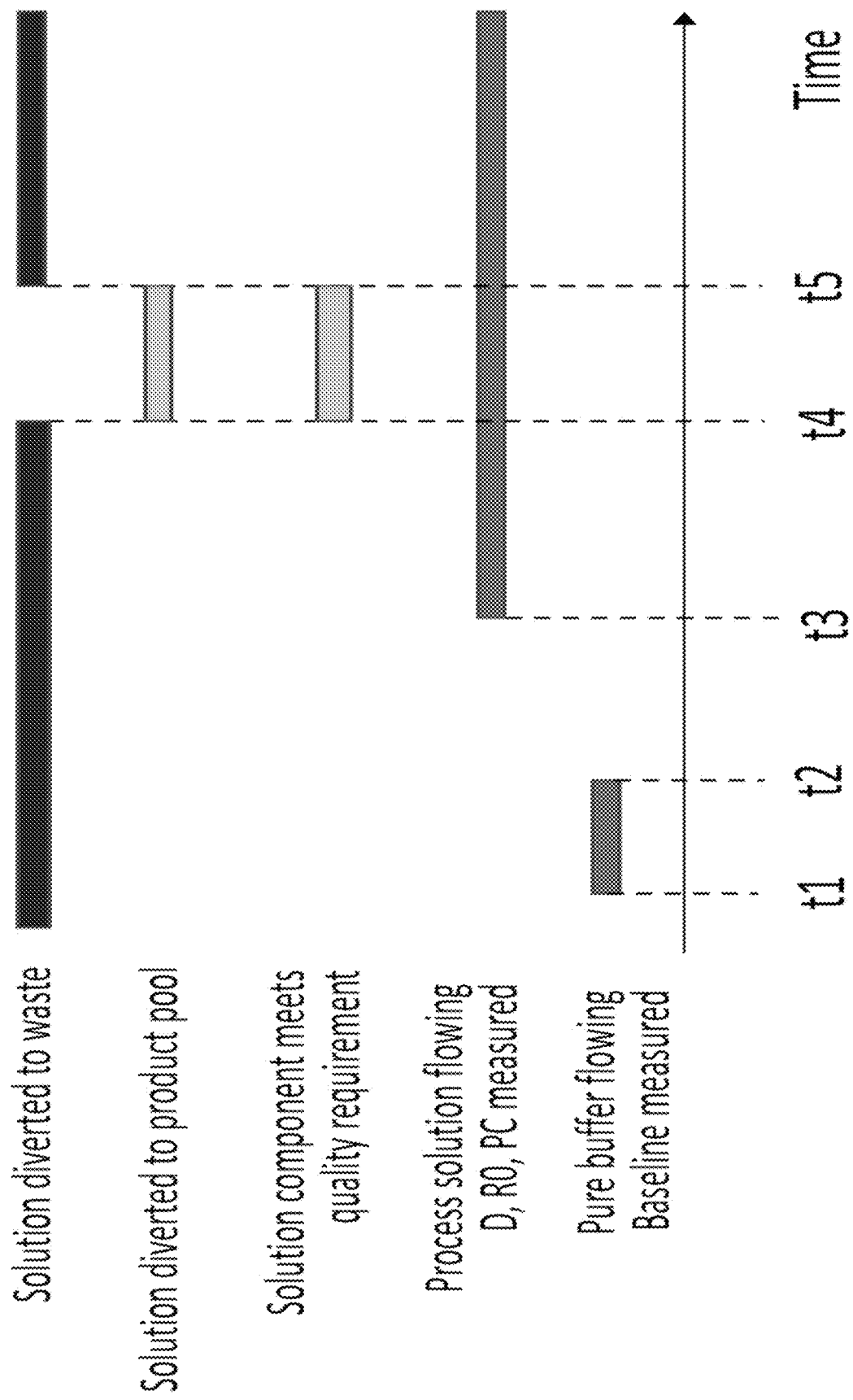
FIG. 3 depicts a graph in accordance with an embodiment.

In an embodiment, FIG. 2D and FIG. 2E depict hardware/instrument configurations of the method, system, and computer product. Also, in an embodiment, FIG. 3 depicts times t1, t2, t3, t4, and t5, of the method, system, and computer product.

Baseline Scattering Intensities of Pure Buffer

In-Line

Figure 4A:
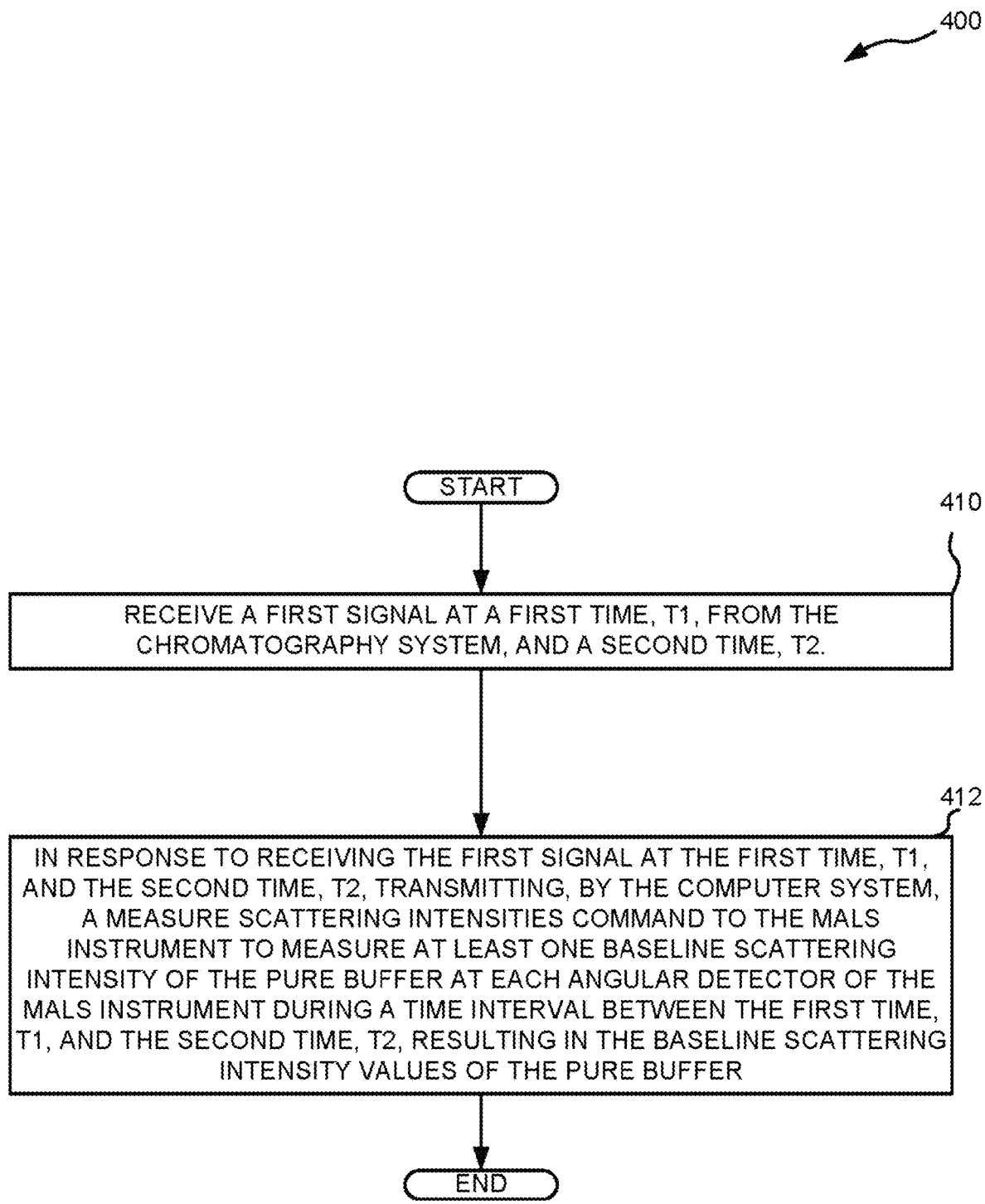
FIG. 4A depicts a flowchart in accordance with an embodiment.

In an embodiment, the receiving the baseline scattering intensity values of the pure buffer includes (a) receiving, by the computer system, a first signal at a first time, t1, from the chromatography system, and a second time, t2, and (b) in response to receiving the first signal at the first time, t1, and the second time, t2, transmitting, by the computer system, a measure scattering intensities command to the MALS instrument to measure at least one baseline scattering intensity of the pure buffer at each angular detector of the MALS instrument during a time interval between the first time, t1, and the second time, t2, resulting in the baseline scattering intensity values of the pure buffer. Referring to FIG. 4A, in an embodiment, receiving operation 210 includes an operation 410 of receiving, by the computer system, a first signal at a first time, t1, from the chromatography system, and a second time, t2, and an operation 412 of, in response to receiving the first signal at the first time, t1, and the second time, t2, transmitting, by the computer system, a measure scattering intensities command to the MALS instrument to measure at least one baseline scattering intensity of the pure buffer at each angular detector of the MALS instrument during a time interval between the first time, t1, and the second time, t2, resulting in the baseline scattering intensity values of the pure buffer. In a further embodiment, the receiving the baseline scattering intensity values of the pure buffer further includes receiving, by the computer system, a second signal at the second time, t2, from the chromatography system.

In an embodiment, the computer system is a computer system 800 as shown in FIG. 8, that executes a purifying a sample solution via real-time multi-angle light scattering script or computer software application that carries out the operations of at least method 400. In an embodiment, the computer system is a computer system/server 812 as shown in FIG. 8, that executes a purifying a sample solution via real-time multi-angle light scattering script or computer software application that carries out the operations of at least method 400. In an embodiment, the computer system is a processing unit 816 as shown in FIG. 8, that executes a purifying a sample solution via real-time multi-angle light scattering script or computer software application that carries out the operations of at least method 400.

On-Line

Figure 4B:
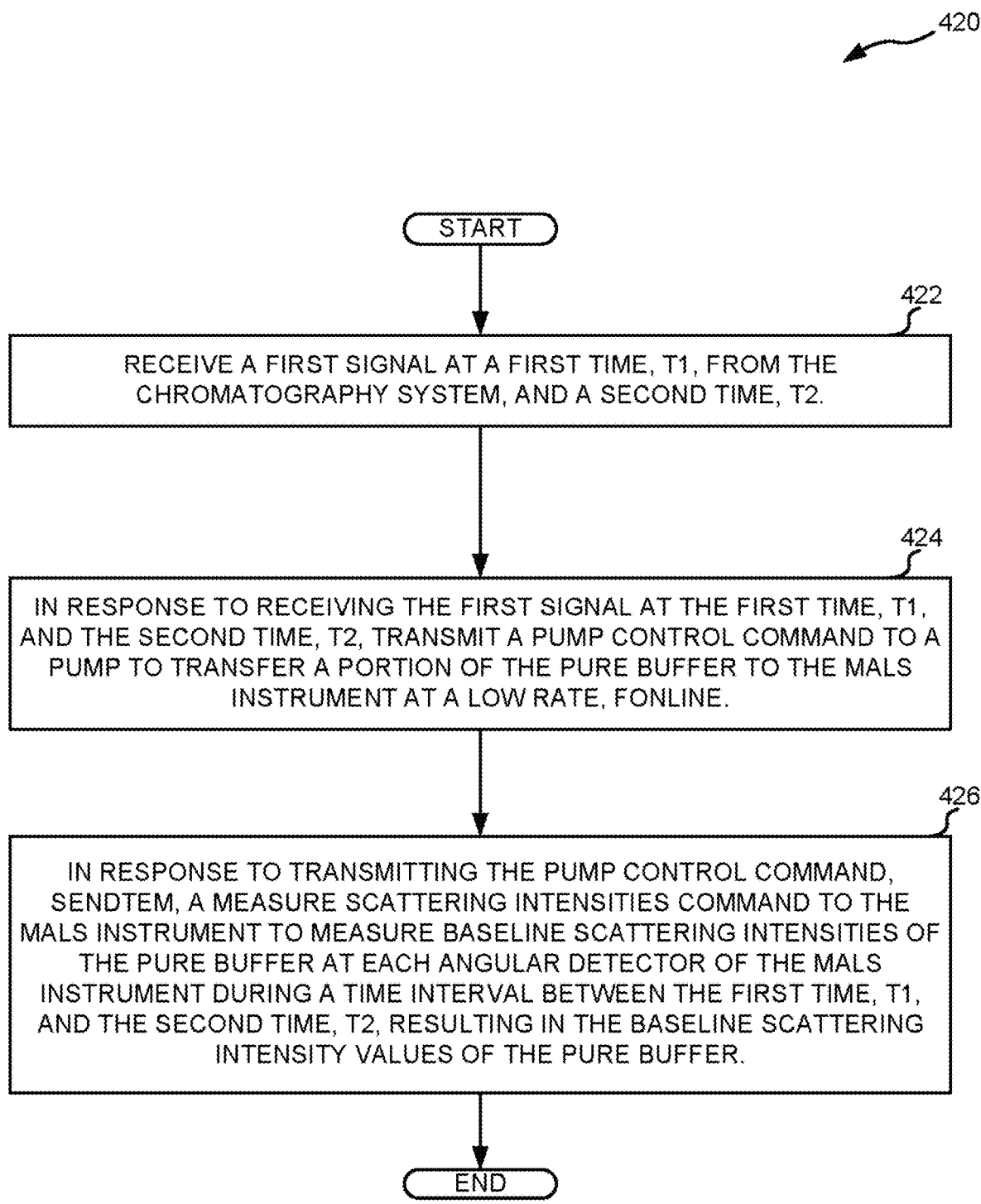
FIG. 4B depicts a flowchart in accordance with an embodiment.

In an embodiment, the receiving the baseline scattering intensity values of the pure buffer includes (a) receiving, by the computer system, a first signal at a first time, t1, from the chromatography system, and a second time, t2, (b) in response to receiving the first signal at the first time, t1, and the second time, t2, transmitting, by the computer system, a pump control command to a pump to transfer a portion of the pure buffer to the MALS instrument at a flow rate, $F_{online}$, and (c) in response to transmitting the pump control command, sending, by the computer system, a measure scattering intensities command to the MALS instrument to measure at least one baseline scattering intensity of the pure buffer at each angular detector of the MALS instrument during a time interval between the first time, t1, and the second time, t2, resulting in the baseline scattering intensity values of the pure buffer. Referring to FIG. 4B, in an embodiment, receiving operation 210 includes an operation 422 of receiving, by the computer system, a first signal at a first time, t1, from the chromatography system, and a second time, t2, an operation 424 of, in response to receiving the first signal at the first time, t1, and the second time, t2, transmitting, by the computer system, a pump control command to a pump to transfer a portion of the pure buffer to the MALS instrument at a low rate, $F_{online}$, and an operation 426 of, in response to transmitting the pump control command, sending, by the computer system, a measure scattering intensities command to the MALS instrument to measure baseline scattering intensities of the pure buffer at each angular detector of the MALS instrument during a time interval between the first time, t1, and the second time, t2, resulting in the baseline scattering intensity values of the pure buffer. In a further embodiment, the receiving the baseline scattering intensity values of the pure buffer further includes receiving, by the computer system, a second signal at the second time, t2, from the chromatography column. For example, the flow rate, $F_{online}$, may be low relative to a typical process flow rate of liters/minute (1/min) (e.g., 0.1-2.0 ml/min, 0.1-5.0 ml/min, 0.05-30.0 ml/min).

In an embodiment, the computer system is a computer system 800 as shown in FIG. 8, that executes a purifying a sample solution via real-time multi-angle light scattering script or computer software application that carries out the operations of at least method 420. In an embodiment, the computer system is a computer system/server 812 as shown in FIG. 8, that executes a purifying a sample solution via real-time multi-angle light scattering script or computer software application that carries out the operations of at least method 420. In an embodiment, the computer system is a processing unit 816 as shown in FIG. 8, that executes a purifying a sample solution via real-time multi-angle light scattering script or computer software application that carries out the operations of at least method 420.

Scattering Intensities of Sample Solution

In an embodiment, the receiving the scattering intensity values of the sample solution includes transmitting, by the computer system, a measure scattering intensities command to the MALS instrument to measure at least one scattering intensity of the sample solution at each angular detector of the MALS instrument, resulting in the scattering intensity values of the sample solution. In an embodiment, receiving operation 212 includes an operation of transmitting, by the computer system, a measure scattering intensities command to the MALS instrument to measure at least one scattering intensity of the sample solution at each angular detector of the MALS instrument, resulting in the scattering intensity values of the sample solution.

Figure 5A:
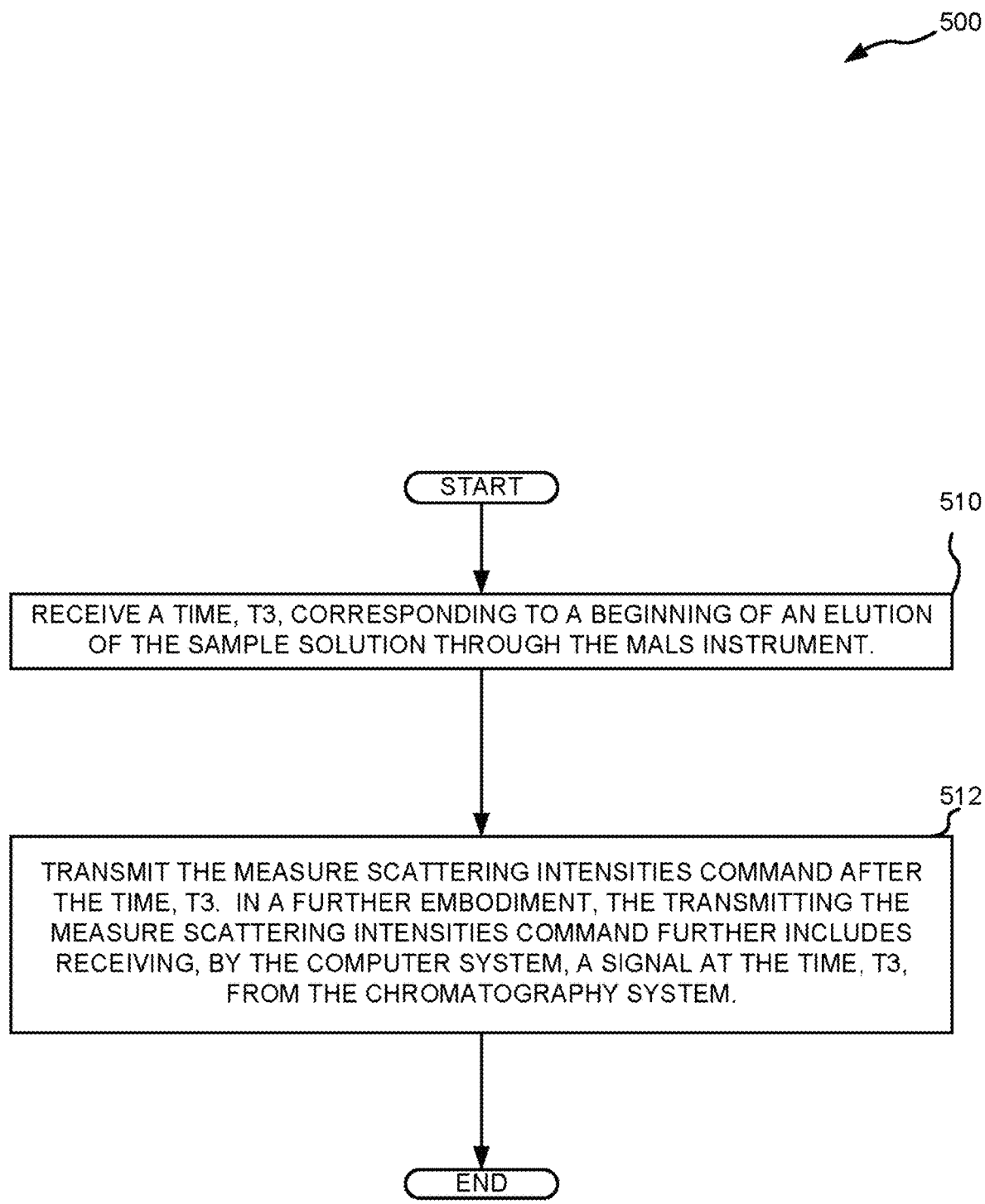
FIG. 5A depicts a flowchart in accordance with an embodiment.

In an embodiment, the transmitting the measure scattering intensities command includes (a) receiving, by the computer system, a time, t3, corresponding to a beginning of an elution of the sample solution through the MALS instrument, and (b) transmitting, by the computer system, the measure scattering intensities command after the time, t3. Referring to FIG. 5A, in an embodiment, the transmitting operation includes an operation 510 of receiving, by the computer system, a time, t3, corresponding to a beginning of an elution of the sample solution through the MALS instrument, and an operation 512 of transmitting, by the computer system, the measure scattering intensities command after the time, t3. In a further embodiment, the transmitting the measure scattering intensities command further includes receiving, by the computer system, a signal at the time, t3, from the chromatography system. In a further embodiment, the transmitting the measure scattering intensities command further includes sending, by the computer system, a transfer process solution command to the pump at the time, t3.

For example, sending the transfer process solution command to the pump at time t3 would happen in in an online system. For example, the time, t3, in an on-line setting, may be received from user input. In another example, the signal at the time, t3, may be received from the chromatography system in an in-line setting or an on-line setting. Also, for example, the transfer process solution command may be sent to the pump at the time, t3, in an on-line setting.

In an embodiment, the computer system is a computer system 800 as shown in FIG. 8, that executes a purifying a sample solution via real-time multi-angle light scattering script or computer software application that carries out the operations of at least method 500. In an embodiment, the computer system is a computer system/server 812 as shown in FIG. 8, that executes a purifying a sample solution via real-time multi-angle light scattering script or computer software application that carries out the operations of at least method 500. In an embodiment, the computer system is a processing unit 816 as shown in FIG. 8, that executes a purifying a sample solution via real-time multi-angle light scattering script or computer software application that carries out the operations of at least method 500.

Characterizing Component of Sample Solution

Figure 5B:
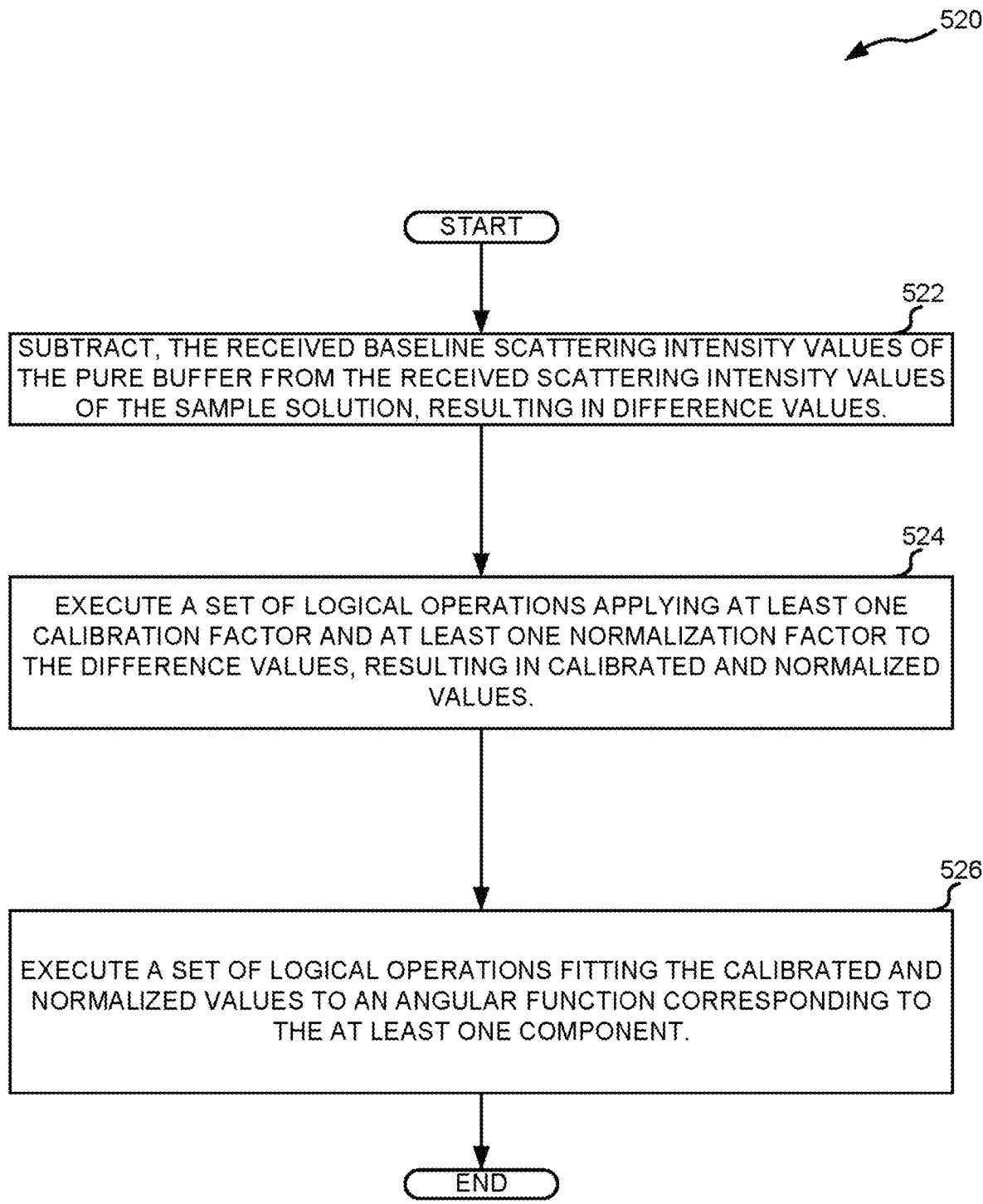
FIG. 5B depicts a flowchart in accordance with an embodiment.
Figure 7:
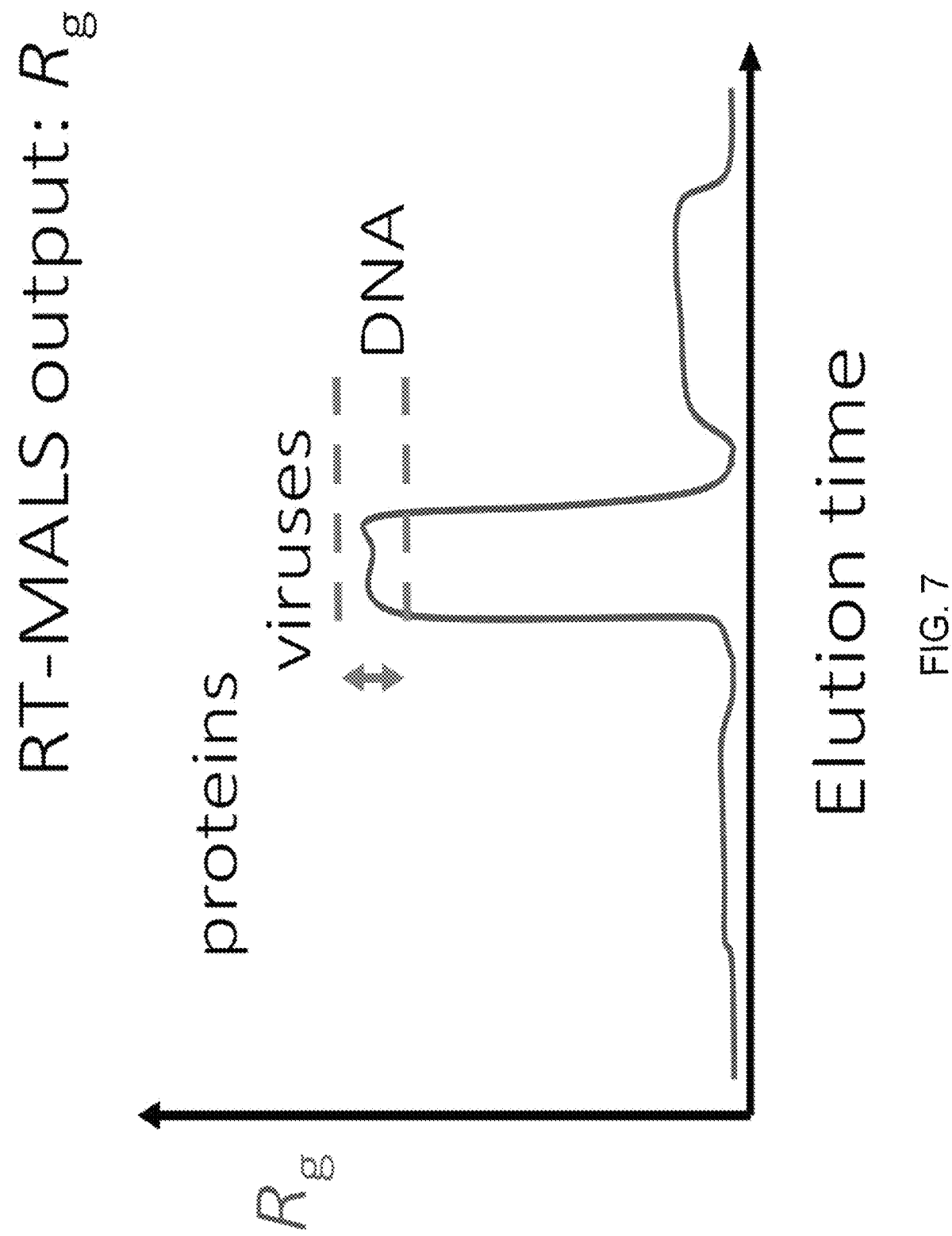
FIG. 7 depicts a graph in accordance with an embodiment.

In an embodiment, the characterizing the at least one component of the sample solution includes (a) subtracting, by the computer system, the received baseline scattering intensity values of the pure buffer from the received scattering intensity values of the sample solution, resulting in difference values, (b) executing, by the computer system, a set of logical operations applying at least one calibration factor and at least one normalization factor to the difference values, resulting in calibrated and normalized values, and (c) executing, by the computer system, a set of logical operations fitting the calibrated and normalized values to an angular function corresponding to the at least one component. Referring to FIG. 5B, in an embodiment, characterizing operation 214 includes an operation 522 of subtracting, by the computer system, the received baseline scattering intensity values of the pure buffer from the received scattering intensity values of the sample solution, resulting in difference values, an operation 524 of executing, by the computer system, a set of logical operations applying at least one calibration factor and at least one normalization factor to the difference values, resulting in calibrated and normalized values, and an operation 526 of executing, by the computer system, a set of logical operations fitting the calibrated and normalized values to an angular function corresponding to the at least one component.

In a further embodiment, the characterizing the at least one component of the sample solution further includes executing, by the computer system, a set of logical operations calculating a particle concentration value of the at least one component with respect to a particle volume of the at least one component and an excess Rayleigh ratio, R0, value of the at least one component. In a particular embodiment, the calculating includes executing, by the computer system, a set of logical operations calculating the particle volume of the at least one component with respect to a shape model of the at least one component and a value of the dimension, D, of the at least one component. In a particular embodiment, the shape model is one of a sphere model, a rod model, and a random coil model.

For example, the calibration factor may be a given value (e.g., value/values related to measuring toluene). In another example, the normalization factor may also be a given value (e.g., value/values related to light scattering measurement(s) of particles with radii of less than 10 nanometers (nm)). Also, for example, the value of the dimension, D, may be a way to get the dimension, D, via a light scattering measurement (e.g., coated sphere, Lorenz Mie sphere).

In an embodiment, the computer system is a computer system 800 as shown in FIG. 8, that executes a purifying a sample solution via real-time multi-angle light scattering script or computer software application that carries out the operations of at least method 520. In an embodiment, the computer system is a computer system/server 812 as shown in FIG. 8, that executes a purifying a sample solution via real-time multi-angle light scattering script or computer software application that carries out the operations of at least method 520. In an embodiment, the computer system is a processing unit 816 as shown in FIG. 8, that executes a purifying a sample solution via real-time multi-angle light scattering script or computer software application that carries out the operations of at least method 520.

Collecting Sample Solution into Product Pool

In further embodiment, the computer implemented method, the system, and the computer program product further include, in response to determining that the values of the dimension, D, fall within the D value range and the values of excess Rayleigh ratio, R0, fall within the excess Rayleigh ratio, R0, value range, transmitting, by the computer system, the collect sample solution command to the chromatography system to collect the sample solution into the product pool, where the chromatography system is configured to begin to collect the sample solution into the product pool at a begin sample collection time, t4.

In further embodiment, the computer implemented method, the system, and the computer program product further include, in response to determining that the values of the dimension, D, fall within the D value range and the values of excess Rayleigh ratio, R0, fall within the excess Rayleigh ratio, R0, value range, transmitting, by the computer system, the collect sample solution command to a divertor valve coupled to the chromatography system to collect the sample solution into the product pool, where the divertor valve is configured to begin to collect the sample solution into the product pool at a begin sample collection time, t4.

Diverting Sample Solution to Waste

In further embodiment, the computer implemented method, the system, and the computer program product further include, in response to determining that at least one of that the values of the dimension, D, do not fall within the dimension, D, value range and that the values of excess Rayleigh ratio, R0, do not fall within the excess Rayleigh ratio, R0, value range, sending, by the computer system, the divert to waste command to the chromatography system to divert the sample solution to the waste container at an end sample collection time, t5. In further embodiment, the computer implemented method, the system, and the computer program product further include, in response to determining that at least one of that the values of the dimension, D, do not fall within the dimension, D, value range and that the values of excess Rayleigh ratio, R0, do not fall within the excess Rayleigh ratio, R0, value range, sending, by the computer system, the divert to waste command to the divertor valve to divert the sample solution to the waste container at an end sample collection time, t5.

Number of Particles and Average Number of Particles in Product Pool

In further embodiment, the computer implemented method, the system, and the computer program product further include (a) executing, by the computer system, a series of logical operations determining a time series of values of particle concentration of the sample solution, during a time interval between the begin sample collection time, t4, and the end sample collection time, t5, and executing, by the computer system, a series of logical operations calculating a number of particles, NP, in the product pool and an average number of particles, $PC_{pool}$, in the product pool, with respect to the time series of values of particle concentration. In a further embodiment, the computer implemented method, the system, and the computer program product further include displaying, by the computer system, on a display, the calculated number of particles, NP, in the product pool and the calculated average number of particles, $PC_{pool}$, in the product pool.

Computer System

In an exemplary embodiment, the computer system is a computer system 800 as shown in FIG. 8. Computer system 800 is only one example of a computer system and is not intended to suggest any limitation as to the scope of use or functionality of embodiments of the present disclosure. Regardless, computer system 800 is capable of being implemented to perform and/or performing any of the functionality/operations of the present disclosure.

Computer system 800 includes a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 812 may be described in the general context of computer system-executable instructions, such as program modules, being executed by a computer system. Generally, program modules may include routines, programs, objects, components, logic, and/or data structures that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computer system 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions/operations of embodiments of the disclosure.

Program/utility 840, having a set (at least one) of program modules 842, may be stored in memory 828 by way of example, and not limitation. Exemplary program modules 842 may include an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the present disclosure.

Computer system/server 812 may also communicate with one or more external devices 814 such as a keyboard, a pointing device, a display 824, one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems.

Computer Program Product

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
    receiving, by a computer system, from a multi-angle light scattering (MALS) instrument baseline scattering intensity values collected over a first period of time of a pure buffer flowed from a chromatography system to the MALS instrument;
    in response to receiving the baseline scattering intensity values of the pure buffer, receiving, by the computer system, from the MALS instrument scattering intensity values collected over a second period of time of a sample solution flowed from the chromatography system to the MALS instrument, the second period of time being after the first period of time;
    in response to receiving the baseline scattering intensity values of the pure buffer following a measurement to determine the baseline scattering intensity values during the first period of time and in response to receiving the scattering intensity values of the sample solution, characterizing, by the computer system, at least one component of the sample solution, resulting in a real-time set of values of a dimension, D, of the at least one component and a real-time set of values of excess Rayleigh ratio, R0, of the at least one component,
        wherein the values of the dimension, D, correspond to one of a root-mean-square (rms) radius, Rg, of the at least one component, a sphere radius, R, of the at least one component, a rod length, L, of the at least one component, and a shape dimension relevant to a shape of the at least one component;
    determining, by the computer system, that the values of the dimension, D, fall within a dimension, D, value range and that the values of excess Rayleigh ratio, R0 fall within an excess Rayleigh ratio, R0, value range,
        wherein the values of the excess Rayleigh ratio, R0, within the excess Rayleigh ratio, R0, value range indicate that a sufficient signal has been received from the MALS instrument for a reliable calculation of the values of the dimension, D,
    in response to determining that the values of the dimension, D, fall within the dimension, D, value range, transmitting, by the computer system, a collect sample solution command to collect the sample solution in a product pool;
    determining, by the computer system, that at least one of the values of the dimension, D, do not fall within the dimension, D, value range; and
    in response to determining that at least one of the values of the dimension, D, do not fall within the dimension, D, value range transmitting, by the computer system, a divert to waste command to divert the sample solution to a waste container.

2. The method of claim 1 wherein the receiving the baseline scattering intensity values of the pure buffer comprises:
    receiving, by the computer system, a first signal at a first time, t1, from the chromatography system, and a second time, t2;

in response to receiving the first signal at the first time, t1, and the second time, t2, transmitting, by the computer system, a measure scattering intensities command to the MALS instrument to measure at least one baseline scattering intensity of the pure buffer at each angular detector of the MALS instrument during a time interval between the first time, t1, and the second time, t2, resulting in the baseline scattering intensity values of the pure buffer.

3. The method of claim 2 further comprising receiving, by the computer system, a second signal at the second time, t2, from the chromatography system.

4. The method of claim 1 wherein the receiving the baseline scattering intensity values of the pure buffer comprises:
receiving, by the computer system, a first signal at a first time, t1, from the chromatography system, and a second time, t2;
in response to receiving the first signal at the first time, t1, and the second time, t2, transmitting, by the computer system, a pump control command to a pump to transfer a portion of the pure buffer to the MALS instrument at a flow rate, $F_{online}$; and
in response to transmitting the pump control command, sending, by the computer system, a measure scattering intensities command to the MALS instrument to measure at least one baseline scattering intensity of the pure buffer at each angular detector of the MALS instrument during a time interval between the first time, t1, and the second time, t2, resulting in the baseline scattering intensity values of the pure buffer.

5. The method of claim 4 further comprising receiving, by the computer system, a second signal at the second time, t2, from the chromatography column.

6. The method of claim 1 wherein the values of excess Rayleigh ratio, R0, correspond to a scattering intensity of the at least one component extrapolated to an angle, 0, measured by the MALS instrument.

7. The method of claim 1 wherein the receiving the scattering intensity values of the sample solution comprises:
transmitting, by the computer system, a measure scattering intensities command to the MALS instrument to measure at least one scattering intensity of the sample solution at each angular detector of the MALS instrument, resulting in the scattering intensity values of the sample solution.

8. The method of claim 7 wherein the transmitting the measure scattering intensities command comprises:
receiving, by the computer system, a time, t3, corresponding to a beginning of an elution of the sample solution through the MALS instrument; and
transmitting, by the computer system, the measure scattering intensities command after the time, t3.

9. The method of claim 8 further comprising receiving, by the computer system, a signal at the time, t3, from the chromatography system.

10. The method of claim 8 further comprising sending, by the computer system, a transfer process solution command to the pump at the time, t3.

11. The method of claim 1 wherein the characterizing comprises:
subtracting, by the computer system, the received baseline scattering intensity values of the pure buffer from the received scattering intensity values of the sample solution, resulting in difference values;
applying, by the computer system, at least one calibration factor and at least one normalization factor to the difference values, resulting in calibrated and nominalized values; and
fitting, by the computer system, the calibrated and normalized values to an angular function corresponding to the at least one component.

12. The method of claim 11 further comprising calculating, by the computer system, a particle concentration value of the at least one component with respect to a particle volume of the at least one component and an excess Rayleigh ratio, R0, value of the at least one component.

13. The method of claim 12 wherein the calculating comprises calculating the particle volume of the at least one component with respect to a shape model of the at least one component and a value of the dimension, D, of the at least one component.

14. The method of claim 13 wherein the shape model is one of a sphere model, a rod model, and a random coil model.

15. The method of claim 1 further comprising, in response to determining that the values of the dimension, D, fall within the D value range and that the values of excess Rayleigh ratio, R0, fall within the excess Rayleigh ratio, R0, value range, transmitting, by the computer system, the collect sample solution command to the chromatography system to collect the sample solution into the product pool,
wherein the chromatography system is configured to begin to collect the sample solution into the product pool at a begin sample collection time, t4.

16. The method of claim 15 further comprising, in response to determining that at least one of the values of the dimension, D, do not fall within the dimension, D, value range and that the values of excess Rayleigh ratio, R0, do not fall within the excess Rayleigh ratio, R0, value range, sending, by the computer system, the divert to waste command to the chromatography system to divert the sample solution to the waste container at an end sample collection time, t5.

17. The method of claim 1 further comprising, in response to determining that the values of the dimension, D, fall within the D value range and that the values of excess Rayleigh ratio, R0, fall within the excess Rayleigh ratio, R0, value range, transmitting, by the computer system, the collect sample solution command to a divertor valve coupled to the chromatography system to collect the sample solution into the product pool,
wherein the divertor valve is configured to begin to collect the sample solution into the product pool at a begin sample collection time, t4.

18. The method of claim 17 further comprising, in response to determining that at least one of the values of the dimension, D, do not fall within the dimension, D, value range and that the values of excess Rayleigh ratio, R0, do not fall within the excess Rayleigh ratio, R0, value range, sending, by the computer system, the divert to waste command to the divertor valve to divert the sample solution to the waste container at an end sample collection time, t5.

19. The method of claim 16 further comprising:
determining, by the computer system, a time series of values of particle concentration of the sample solution, during a time interval between the begin sample collection time, t4, and the end sample collection time, t5; and
calculating, by the computer system, a number of particles, NP, in the product pool and an average number of particles, $PC_{pool}$, in the product pool, with respect to the time series of values of particle concentration.

20. The method of claim 19 further comprising displaying, by the computer system, on a display, the calculated number of particles, NP, in the product pool and the calculated average number of particles, $PC_{pool}$, in the product pool.

21. The method of claim 18 further comprising:
determining, by the computer system, a time series of values of particle concentration of the sample solution, during a time interval between the begin sample collection time, t4, and the end sample collection time, t5; and
calculating, by the computer system, a number of particles, NP, in the product pool and an average number of particles, $PC_{pool}$, in the product pool, with respect to the time series of values of particle concentration.

22. The method of claim 21 further comprising displaying, by the computer system, on a display, the calculated number of particles, NP, in the product pool and the calculated average number of particles, $PC_{pool}$, in the product pool.

23. A system comprising:
a memory; and
a processor in communication with the memory, the processor configured to perform a method comprising:
receiving from a multi-angle light scattering (MALS) instrument baseline scattering intensity values collected over a first period of time of a pure buffer flowed from a chromatography system to the MALS instrument,
in response to receiving the baseline scattering intensity values of the pure buffer, receiving from the MALS instrument scattering intensity values collected over a second period of time of a sample solution flowed from the chromatography system to the MALS instrument, the second period of time being after the first period of time;
in response to receiving the baseline scattering intensity values of the pure buffer following a measurement to determine the baseline scattering intensity values during the first period of time and in response to receiving the scattering intensity values of the sample solution, characterizing at least one component of the sample solution, resulting in a time set of values of a dimension, D, of the at least one component and a real-time set of values of excess Rayleigh ratio, R0, of the at least one component,
wherein the values of the dimension, D, correspond to one of a root-mean-square (rms) radius, Rg, of the at least one component, a sphere radius, R, of the at least one component, a rod length, L, of the at least one component, and a shape dimension relevant to a shape of the at least one component,
determining that the values of the dimension, D, fall within a dimension, D, value range and that the values of excess Rayleigh ratio, R0, fall within an excess Rayleigh ratio, R0, value range,
wherein the values of the excess Rayleigh ratio, R0, within the excess Rayleigh ratio, R0 value range indicate that a sufficient signal has been received from the MALS instrument for a reliable calculation of the values of the dimension, D in response to determining that the values of the dimension, D, fall within the dimension, D, value range, transmitting a collect sample solution command to collect the sample solution in a product pool,
determining that at least one of the values of the dimension, D, do not fall within the dimension, D, value range, and
in response to determining that at least one of the values of the dimension, D, do not fall within the dimension, D, value range, transmitting a divert to waste command to divert the sample solution to a waste container.

24. A computer program product comprising a computer readable storage medium having program instructions embodied therewith, the program instructions executable by a processor to cause the processor to perform a method comprising:
receiving from a multi-angle light scattering (MALS) instrument baseline scattering intensity values collected over a first period of time of a pure buffer flowed from a chromatography system to the MALS instrument;
in response to receiving the baseline scattering intensity values of the pure buffer, receiving from the MALS instrument scattering intensity values collected over a second period of time of a sample solution flowed from the chromatography system to the MALS instrument, the second period of time being after the first period of time;
and in response to receiving the scattering intensity values of the sample solution, characterizing at least one component of the sample solution, resulting in a real-time set of values of a dimension, D, of the at least one component and a real-time set of values of excess Rayleigh ratio, R0, of the at least one component,
wherein the values of the dimension, D, correspond to one of a root-mean-square (rms) radius, Rg, of the at least one component, a sphere radius, R, of the at least one component, a rod length, L, of the at least one component, and a shape dimension relevant to a shape of the at least one component;
determining that the values of the dimension, D, fall within a dimension, D, value range and that the values of excess Rayleigh ratio, R0, fall within an excess Rayleigh ratio, R0, value range,
wherein values of the excess Rayleigh ratio, R0, within the excess Rayleigh ratio, R0, value range indicate that a sufficient signal has been received from the MALS instrument for a reliable calculation of the values of the dimension, D,
in response to determining that the values of the dimension, D, fall within the dimension, D, value range, transmitting a collect sample solution command to collect the sample solution in a product pool,
determining that at least one of the values of the dimension, D, do not fall within the dimension, D, value range, and
in response to determining that at least one of the values of the dimension, D, do not fall within the dimension, D, value range transmitting a divert to waste command to divert the sample solution to a waste container.

* * * * *